March 13, 1934.  M. R. TREMBOUR  1,950,871
METHOD OF MAKING COMPOSITE METAL ARTICLES
Filed Jan. 10, 1933
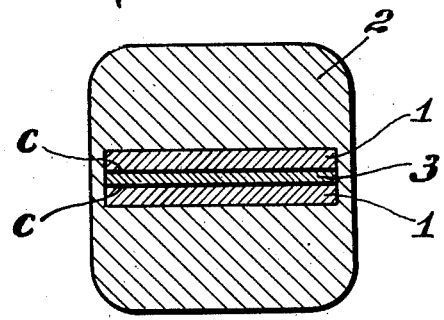
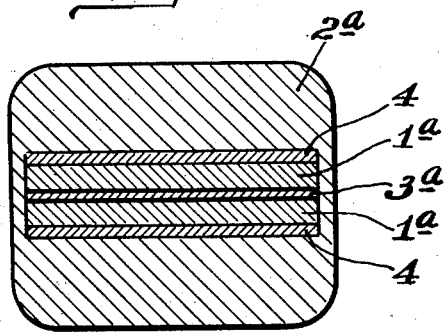

Patented Mar. 13, 1934

1,950,871

UNITED STATES PATENT OFFICE 1,950,871

METHOD OF MAKING COMPOSITE METAL ARTICLES

Max R. Trembour, Beaver, Pa., assignor to Jessop Steel Company, Washington, Pa., a corporation of Pennsylvania Application January 10, 1933, Serial No. 651,013

5 Claims. (Cl. 29—189)

In the manufacture of composite or bimetallic articles, such as plates or sheets consisting of an ordinary base metal, such as common steel, with a welded on relatively thin surface layer of a more expensive metal, such as stainless steel, nickel, etc., the more advanced methods are based upon the formation within a composite ingot of one unweldable and two weldable planes, the former between two metals of the same composition, the latter between two metals of different compositions. The unweldable plane is formed by the application of a suitable weld-preventing compound to the contacting surfaces of two plates of the more expensive metal, which are then fastened together so as to form a unit with weldable exposed surfaces, around which the common metal is cast in a continuous envelope, as described in my copending application, Ser. No. 578,661, filed December 3, 1931.

It is among the objects of this invention to provide an improved procedure for the manufacture of composite metal articles, especially those composed of a body of cheap ferrous metal, such as mild steel, surfaced with a more noble metal, such as the stable surface ferrous alloys of chromium, and more particularly to minimize or avoid difficulties heretofore encountered in the practice of the general procedure referred to hereinabove, whereby to render the practice of that procedure more certain, eliminate certain of its disadvantages, and to improve the product thereof. Other advantages will be recognized from the following description.

The invention may be described in connection with the accompanying drawing, in which Fig. 1 is a cross section through an ingot made in accordance with one embodiment of the invention; and Fig. 2 a view similar to Fig. 1 showing another embodiment.

One of the most important points in the manufacture of such composite articles, especially in the case of socalled "stainless clad" sheets and plates, is the preparation of a perfectly smooth or polished surface on the finished article, and, as set forth in my aforesaid copending application, one of the principal advantages of the unweldable plane principle of manufacture lies in the fact that such a surface can be applied to the material in slab or plate form, before the final rolling to thinner sections with much larger surfaces, and that in a general way it is possible to maintain the smoothness of the finish during said rolling, which results in a very considerable saving of manufacturing costs.

It is, of course, impossible to roll by this method sheets with a perfect polish, even though the insert plates were provided with such a finish. The principal reason for this lies in the fact that, in order to secure the necessary welds within the composite ingot, it is generally inevitable that the latter be heated well above the recrystallization point of the insert material, which, of course, destroys the polish, if this did not take place already during the casting of the ingot. But, since these surfaces are completely enclosed and therefore protected against oxidation and scratching or marking by the rolls and tools etc., the original smoothness of the finish can be substantially maintained.

I have found, however, that certain difficulties may be encountered in this process, especially in the case of larger ingots, which may make it desirable to modify the original method of preparing the insert units.

It is, for instance, difficult to apply to a perfectly smooth, and especially to a fully polished surface, a weld-preventing coating, that will adhere without flaking off, when the plates, to which it has been applied, are suddenly heated, as is the case when the envelope metal is cast about them, or during the handling or reheating of the ingot after the casting operation. I have found that these plates, especially in larger units, are apt to warp and buckle and to lose their originally perfect face to face contact, particularly near their central portions, even though the edges may remain in perfect contact. If this happens, it is obvious that the coating, which at best has a very precarious hold on a perfectly smooth or polished surface, may lose this hold completely and flake off, leave some spots on the surface completely bare and accumulate in others, where it is not desired. This will, of course, result in welds on the bare spots and in depressions in the surface of both plates, where the accumulations have taken place. In both cases the surfaces may be completely spoiled and it may become impossible to separate the plates after the rolling operation without tearing them.

I have found that these difficulties can be substantially eliminated and other advantages, as explained below, may be gained, by applying the weld-preventing coating to a separate sheet or plate of metal interposed between the two surfaces, that are not to be welded, instead of to these surfaces themselves.

I have also found that the warping of the plates can be greatly reduced or completely prevented if the envelope metal is not cast directly against these plates, but against the outer surfaces of two plates of ordinary metal covering the outer surfaces of the two special metal plates.

The sheet or plate, to which the weld-preventing material is applied, is preferably of ordinary mild steel and of relatively thin section. Since it is usually located directly in the center of the ingot or mould, its temperature changes upon heating and cooling will necessarily be quite uniform throughout its section, which practically eliminates the danger of warping and the resulting spalling of the coating applied to its two sides. If, however, there should develop some defective spots in the coating, it will still be possible to separate the composite sheets after rolling without permanent damage to the special metal surfaces, because in this case the thin interposed mild steel sheet will tear rather than the usually harder and stronger special metal surfaces, and the damage can be repaired by spotgrinding.

It is well known that of the special metals employed as inserts within the scope of this invention, stainless steels particularly are very poor thermal conductors, so that plates of this material, if heated from one side only, are very apt to warp. This condition will almost inevitably arise if molten steel is cast directly against such an insert, especially if the mould is filled from the top in the ordinary way, since in this operation the stream of molten metal often strikes directly against one side of the insert.

It is also known that it is much more difficult to weld stainless and other highly alloyed steels to an ordinary steel than to weld two ordinary steels to each other. In the former case a weld can only be obtained if the contact surfaces of the two metals are absolutely clean. It is relatively simple to make the outer surfaces of the insert plates clean enough for this purpose, but it is quite difficult to cast molten steel under conditions which will positively prevent the formation of all oxides. Unless the steel be cast in vacuo, such oxides are inevitably formed, and they have a tendency to be deposited in patches upon the surfaces of the casting, that is, in the casting of an ingot around an insert, some oxide patches will be formed between the contact surfaces of the insert and the cast metal.

In such an ingot is rolled, there will be unwelded spots between the two metals, which will give rise to formation of blisters directly under the relatively thin coating or veneer of special metal, which may completely spoil the article.

I have found that by fastening a clean weldable plate of ordinary metal, similar in composition to the cast metal of the envelope, to each of the two outer clean surfaces of the special metal insert plates, I can not only substantially reduce the warping of the latter, but can obtain a better weld, since by this method the contacting surfaces of the special and the ordinary metal can be kept absolutely clean and whatever oxide patches may be formed during the casting of the ingot, will be deposited deeper under the surface of the special metal and within the ordinary metal, where they do not damage the finish of the rolled article.

In reference to the attached drawing, Fig. 1 is a cross-section through an ingot made in accordance with my invention. The two plates 1 are of a special metal, such as stainless or heat-resisting steel, nickel, or other special metal or alloy. Their outer surfaces, in contact with the ordinary mild steel 2 of the cast envelope, are perfectly clean, while their inner surfaces, contacting with the separating plate 3, are perfectly flat and smooth. They may also be perfectly clean and free from oxide or they may be covered by a light, uniform and tightly adhering smooth coat of oxide, such for instance as may be produced by heating to a temperature below the one at which scaling begins. The separating plate or sheet 3 has flat and smooth surfaces and is covered on both sides with a uniform coating C of a suitable weld-preventing substance. This substance may consist of an inert oxide, such as magnesia, with a suitable binder, such as water glass, or it may be a tightly adhering scale. The methods of producing such a scale of uniform thickness and of perfectly smooth finish are well known to the experienced rolling mill man. This separating plate or sheet may consist of any suitable metal, but it is preferably made of an ordinary cheap steel.

Fig. 2 is a cross-section through an ingot with an insert representing both principal features of my invention. The insert, as in the case of Fig. 1, comprises plates 1a of special metal, such as stainless steel, nickel, or the like, disposed on opposite sides of a separating plate 3a whose surfaces are covered with a coating of weld-preventing material. The outer surfaces of plates 1a are in clean weldable condition, although they need not be smooth, and the outer surfaces of these two plates are covered by plates 4 of common mild steel or the like whose surfaces likewise are in weldable condition. Mild steel 2a is then cast around the insert to completely envelop it and form the ingot shown in section in Fig. 2.

The ingots are preferably bottom poured, especially in the case of ingots of large size.

It is understood that the several plates making up the insert are fastened together by suitable means, such as bolting, clamping, welding or the like, so that they can be handled as a unit and do not separate in the casting of the ingot. It is also understood that they are placed into the moulds so as to be out of direct contact with the bottoms and side walls of the latter. It is further understood that the molten metal is cast so as to completely surround and cover the inserts and so as to form a continuous gastight envelope around the latter. It is also understood that two or more such inserts may be placed into the same mould, parallel to and at any suitable distance from each other.

It is furthermore understood that no substantial welding is intended or occurs in the casting of the ingot, but that, in order to effect a welding of all the contacting or adjoining surfaces excepting the ones separated by the weld-preventing material, it is necessary to hot roll the ingot. This is done substantially in one plane only, that is by passing the hot ingot with the weld-preventing plane or planes parallel to the roll axes between ordinary plate or sheet mill rolls. I have found that the best temperature to carry out the forming and welding operation is the one, which is most suitable for the rolling of the harder or stiffer component and that it is as a rule not necessary nor desirable to heat to the so-called welding temperature.

After completion of the rolling operation the plates, sheets, bands etc. may be heat treated, if necessary, the solid ordinary metal at the ends and sides is trimmed off and the two or more laminæ are parted along the unwelded plane or planes.

It is understood that in the appended claims the term plate comprises any flat section irrespective of thickness or gauge. Having described my invention, I claim:

1. The method of making composite metallic plate or sheet formed of a body of base metal having welded thereto a facing of special metal, comprising supporting in an ingot mold an insert formed of a plurality of metallic plates fastened together in fixed face-to-face relation, the insert including a central metallic plate having both faces smooth, and a plate of special metal on each side of said central plate and separated therefrom by a layer of weld-preventing material, the surface of said special metal plate adjacent the central plate being smooth, and the outer exposed faces of the insert being in clean weldable condition, casting base metal into the mold to form an ingot in which the insert is completely enveloped by base metal, and hot working said ingot by the application of working pressure to the faces of the ingot corresponding to the faces of said insert to effect welding between said weldable surfaces of the insert and the body of the ingot and to convert the ingot into a laminated plate which, upon removing the margin of solid metal outside the insert, is partable along the planes formed by said weld-preventing material into two composite plates.

2. The method of making composite metallic plate of sheet formed of a body of base metal having welded thereto a facing of special metal, comprising supporting in an ingot mold an insert formed of three metallic plates fastened together in fixed face-to-face relation, the insert consisting of a central metallic plate having both faces smooth and covered with a coating of weld-preventing material, and two plates of said special metal disposed one on each side of the central plate, the surfaces of said special metal plates adjacent the central plate being smooth, and the outer exposed surface of the insert being in clean weldable condition, casting said base metal around the insert to completely envelop it and form an ingot in which said weld-preventing coatings act as dividing planes, hot rolling the ingot between rolls acting on the faces of the ingot corresponding to the faces of the insert to effect welding between the base metal and said weldable surface of the insert, cropping off the margin of solid metal along the edges of the worked product to expose said planes, and parting along said planes to form said composite plates.

3. The method of making composite metallic sheet formed of a body of mild steel having welded thereto a facing of stainless steel, comprising supporting in an ingot mold an insert formed of a plurality of metallic plates fastened together in fixed face-to-face relation, the insert including a central metallic plate having both faces smooth and covered with a coating of weld-preventing material, and a plate of stainless steel on each side of the central plate, the surfaces of the stainless steel plates adjacent the central plate being smooth, and the outer surface of the insert being in clean weldable condition, casting mild steel around the insert to completely envelop it and form an ingot in which said weld-preventing coatings act as dividing planes, hot rolling the ingot between rolls acting on the faces of the ingot corresponding to the faces of the insert to effect welding between the body of mild steel and said weldable surface of the insert, cropping off the margin of solid metal along the edges of the worked product to expose said planes, and parting along said planes to form said composite plates.

4. The method of making composite metallic plate or sheet formed of a body of base metal having welded thereto a facing of special metal, comprising supporting in an ingot mold an insert formed of five metallic plates fastened together in fixed face-to-face relation, the insert including a central metallic plate having both faces smooth and covered with a coating of weld-preventing material, a pair of plates of said special metal disposed one on each side of the central plate and having the surface adjacent the central plate smooth and the outer surface in clean weldable condition, and a pair of outer base metal plates having both surfaces in clean weldable condition disposed in contact with the outer surfaces of said special metal plates, casting said base metal around the insert to completely envelop it and form an ingot in which said weld-preventing coatings form dividing planes, hot rolling the ingot between rolls acting on the faces of the ingot corresponding to the faces of the insert to effect welding between the body of the ingot, said base metal plates and the outer surfaces of said special metal plates, cropping off the margin of solid metal along the edges of the worked product to expose said planes, and parting along said planes to form said composite plates.

5. The method of making composite metallic plate or sheet formed of a body of mild steel having welded thereto a facing of stainless steel, comprising supporting in an ingot mold an insert formed or five metallic plates fastened together in fixed face-to-face relation and including a central metallic plate having both faces smooth and covered with a coating of weld-preventing material, two plates of stainless steel arranged one on each side of the central plate and having the surface adjacent thereto smooth and the outer surface in clean weldable condition, and a mild steel outer plate having its surfaces in clean weldable condition in contact with the outer surface of each of the stainless plates, casting mild steel around the insert to completely envelop it and form an ingot in which said weld-preventing coatings form dividing planes, hot rolling the ingot between rolls acting on the faces of the ingot corresponding to the faces of the insert to effect welding between the body of the ingot, said mild steel plates and said weldable surface of the stainless plates, cropping off the margin of solid metal along the edges of the worked product to expose said planes, and parting along said planes to form said composite plates.

M. R. TREMBOUR.

CERTIFICATE OF CORRECTION.

Patent No. 1,950,871.             March 13, 1934.

MAX R. TREMBOUR.

It is hereby certified that error appears in the printed specification of the above numbered patent requiring correction as follows: Page 3, line 29, claim 2, for "of" first occurrence, read or; and line 118, claim 5, for "or" read of; and that the said Letters Patent should be read with these corrections therein that the same may conform to the record of the case in the Patent Office.

Signed and sealed this 15th day of May, A. D. 1934.

Bryan M. Battey (Seal)                            Acting Commissioner of Patents.